March 22, 1960   J. E. LINDSAY   2,929,249
PRESSURE GAGE
Filed Sept. 10, 1956

JAMES E. LINDSAY
INVENTOR.

BY Lyon+Lyon
ATTORNEYS

— # United States Patent Office 2,929,249
Patented Mar. 22, 1960

2,929,249

PRESSURE GAUGE

James E. Lindsay, Pasadena, Calif.

Application September 10, 1956, Serial No. 608,868

4 Claims. (Cl. 73—418)

This invention relates to pressure gages, and included in the objects of this invention are:

First, to provide a pressure gage which is capable of withstanding transient or sustained pressure, greatly in excess of the normal operation range of the gage without the slightest damage or change in the accuracy of the gage.

Second, to provide a pressure gage which is particularly suited for measuring accurately on an expanded scale a relatively narrow range of pressures although the pressure to which the gage is subjected may drop materially below a rise materially above the selected range to be measured.

Third, to provide a pressure gage which utilizes as its sole moving element a multiple turn Bourdon tube.

With the above and other objects in view, as may appear hereinafter, reference is directed to the accompanying drawings in which.

Figure 1:
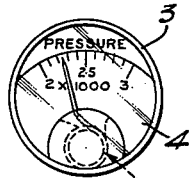
Figure 1 is a top or plan view of the gage.
Figure 2:
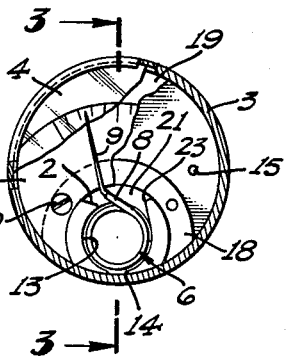
Fig. 2 is a partial plan, partial sectional view taken through 2—2 of Fig. 3.

The pressure gage includes a base member 1 in the form of a disk having a depending end fitting 2 for connection to a pressure line. The base is adapted to receive a cylindrical case 3 having a transparent cover 4. The periphery of the base may be provided with a seal ring 5 for sealingly engaging the lower margin of the case 3.

Mounted within the case 3 is a multiple turn Bourdon tube 6. In the construction shown, the Bourdon tube is wrapped helically to form a cylindrical structure with the turns or coils of the tube in contiguous relation. The physical characteristics of the tube, its cross sectional area, the number of turns, and the diameter of the resulting cylinder determine the pressure range in which the gage functions; that is, for relatively low pressures the wall thickness of the tube is reduced, the number of turns increased, and the diameter of the resulting cylinder increased, or anyone of these factors may be modified to meet the desired condition. These factors are also manipulated to vary the sensitivity of the gage, irrespective of the range in which it is intended to operate.

The Bourdon tube 6 is provided with a tangentially extending lower end portion 7 which is bent at right angles and communicates with the interior of the end fitting 2 so that the interior of the Bourdon tube is subjected to the pressure in the pressure line, not shown, to which the gage is attached. The upper or free end 8 of the Bourdon tube 6 also forms a tangential extension in which is fitted a pointer shaft 9. The axis of the pointer shaft is so oriented as to extend radially from the cylinder defined by the coils of the Bourdon tube.

The Bourdon tube 6 is encased in a guard member 10, which includes a flat disk or plate 11 adapted to seat on the base 1. Eccentrically located on the disk or plate 11 is a post 12 having a bore 13. The bore is so located as to be approximately tangential to the post 12 and disk 11, and is intersected by a longitudinal slot 14 extending the axial length of the guard member 10.

The diameter of the bore 13 is slightly greater than the normal diameter of the Bourdon tube 6 so that the Bourdon tube is normally loosely retained therein. However, should the Bourdon tube be subjected to excessive internal pressure, the Bourdon tube expands into contact with the walls of the bore 13 and is fully restrained against further expansion; it being noted that the wall thickness of the post 12 is such as to withstand any loads imposed by the Bourdon tube 6.

The guard member 10 is held in place with the disk or plate 11 concentric with the base 1 by means of pins 15 which extend into holes 16 provided in the base 1.

Figure 3:
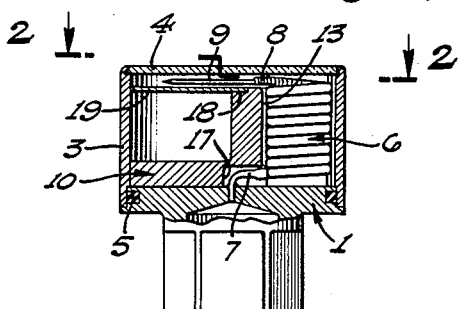
Fig. 3 is a partial sectional, partial elevational view taken through 3—3 of Fig. 2.
Figure 4:
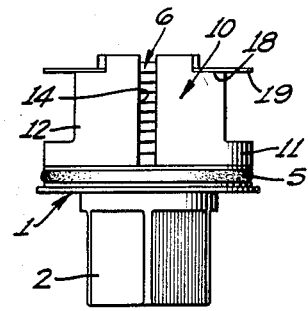
Fig. 4 is a side view thereof with the outer case removed.
Figure 5:
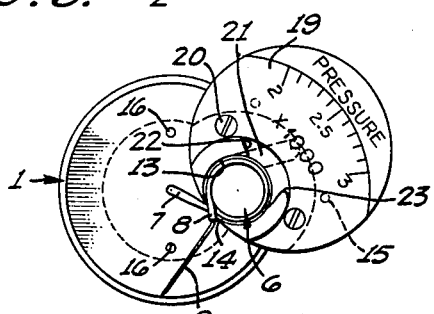
Fig. 5 is a plan view thereof with the outer case removed and illustrating the manner in which the Bourdon tube guard member is positioned or removed.
Figure 6:
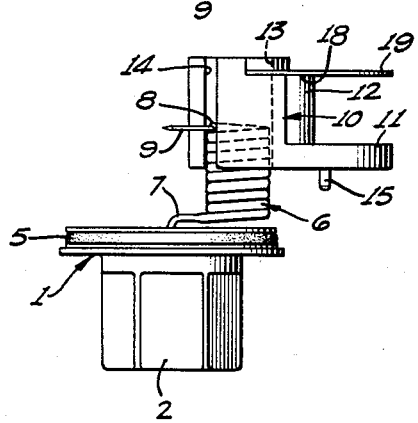
Fig. 6 is a side view showing the guard member in the process of installation or removal from the Bourdon tube.

The guard member 10 is assembled on the Bourdon tube in the manner shown in Figs. 5 and 6. The guard member is turned so that the upper end 8 and pointer shaft or indicating arm 9 of the Bourdon tube aligns with the longitudinal slot 14. The guard member 10 is then slipped axially over the Bourdon tube and the upper or free end of the Bourdon tube is lifted axially a sufficient distance to clear the upper end of the guard member. The guard member 10 may then be turned into its final position with the plate or disk 11 concentric with the base 1, as shown in Figs. 3 and 4. A clearance channel 17 is provided in the underside of the plate 11 to receive the lower end 7 of the Bourdon tube.

Adjacent its upper end, the post 12 is provided with a step or ledge 18 which is parallel with the plate 11 and which supports a dial plate 19, the plate being secured thereto by screws 20. The upper extremity of the post 12 is provided with a shallow circumferential slot 21 which receives the upper end 8 and pointer 9 of the Bourdon tube.

The circumferential extremities of the slot 21 form stop shoulders 22 and 23 which limit arcuate movement of the pointer shaft or indicating arm 9. Either or both stop shoulders may be used; that is, if the gage is designed to indicate a range of pressures above a zero minimum pressure and there is the added possibility that the maximum scale pressure may be exceeded, both stops function. For example, in the drawings the gage is shown as arranged to indicate pressures between 2000 lbs. and 3000 lbs. Thus the stop shoulder 22 functions to restrain the pointer shaft or indicating arm 9 if the pressure is below 2000 lbs., whereas the stop shoulder 23 restrains the pointer if the pressure should rise above 3000 lbs.

The diameter of the bore 13 is such that if the pressure rises appreciably above the maximum intended range of the pressure gage, the cylinder formed by the multiple coils of the Bourdon tube is restrained against expansion. The result is that the pressure gage may withstand either transient or sustained pressures far in excess of the intended range of expansion of the gage. This is particularly advantageous where the gage is used to indicate a pressure differential between the two high pressures under conditions where the gage may at times be subjected to the full pressure. By reason of the guard member 10 such excessive pressure cannot cause distortion of the Bourdon tube beyond its elastic limit, so that as such excessive pressure is relieved the calibration or accuracy of the gage is no wise affected.

It should be observed that under normal operations within the intended pressure range of the gage, the guard member 10 does not in any manner interfere with the free movement of the Bourdon tube. That is, under these conditions there is no frictional resistance to movement of the Bourdon tube which would in any way interfere with its accuracy.

It will also be observed that by reason of the longitudinal slot 14 the Bourdon tube 6 may be installed in place, and the guard member 10 with the dial plate 19 may be readily installed.

The upper end of the post 10 may be covered by a small plate, not shown, or the overlying region of the cover 4 may be made opaque, as suggested in Fig. 1.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A pressure responsive device, comprising: a housing structure having a fitting for connection to a pressure line; a Bourdon tube having a plurality of convolutions of uniform diameter to define a cylinder, a tube portion at one end of said Bourdon tube being fixed to said fitting for communication with said pressure line, and an indicating arm fixed on the opposite free end of said Bourdon tube extending generally radially outwardly of said convolutions; a guard tube having a longitudinal slot extending the length thereof and of a width slightly greater than the width of said indicating arm whereby said slot is adapted to slide over said indicating arm, said guard tube being dimensioned to slip freely over said convolutions to surround the same with only slight clearance; means for securing said guard tube relative to said housing structure; said guard tube restraining the free end of said Bourdon tube against lateral displacement whereby said indicating arm moves about the axis of said cylinder; said guard tube restraining said convolutions against excessive expansion in the event of excessive presssure in said Bourdon tube.

2. A pressure responsive device, comprising: a fitting for connection to a pressure line, a Bourdon tube having a plurality of convolutions of uniform diameter to define a cylinder, one end of said Bourdon tube being fixed to said fitting for communication with said pressure line, and an indicating arm fixed on the opposite free end of said Bourdon tube extending generally radially outwardly beyond said convolutions; a guard tube dimensioned to slip freely over said convolutions with slight clearance and having a longitudinal slot extending the length thereof and of a width sufficient to clear said indicating arm as said guard tube is slipped axially over said convolutions; means for rigidly securing said guard tube relative to said fitting whereby said guard tube surrounds said convolutions and restrains the free end of said Bourdon tube against lateral displacement thereby to cause said indicating arm to move about the axis of the cylinder defined by said convoluitons, said guard tube also restraining the convolutions of said Bourdon tube against excessive expansion in the event of excessive pressure in said Bourdon tube.

3. A pressure responsive device, comprising: a base plate having a fitting for connection to a pressure line; a Bourdon tube having a plurality of convolutions of uniform diameter to define a cylinder, one end of said Bourdon tube being fixed to said fitting for communication with said pressure line, and an indicating arm fixed on the opposite free end of said Bourdon tube to extend generally radially outwardly beyond said convolutions; a guard tube dimensioned to slip freely over said convolutions with slight clearance and having a longitudinal slot extending the length thereof and of a width sufficient to clear said sensing arm as said guard tube is slipped axially over said convolutions; means for rigidly securing said guard tube to said base plate whereby said guard tube surrounds said convolutions and restrains the free end of said Bourdon tube against lateral displacement thereby to cause said indicating arm to move about the axis of the cylinder defined by said convolutions, said guard tube also restraining the convolutions of said Bourdon tube against excessive expansion in the event of excessive pressure in said Bourdon tube.

4. A pressure responsive device, comprising: a base member having a fitting for connection to a pressure line; a Bourdon tube including a plurality of convolutions of uniform diameter to define a cylinder, the ends of said Bourdon tube having a tube portion and an indicating arm respectively extending generally radially outwardly from opposite ends thereof, the points of emergence of said tube portion and said indicating arm from said cylinder being in substantial longitudinal alignment, said tube portion being fixed for communication with said pressure line, said indicating arm being adapted to move in an arc in response to pressure variations in said Bourdon tube; a guard member having a bore to slidably receive the cylindrical portion of said Bourdon tube with slight clearance and a longitudinal slot in the side wall of said bore extending the length of said guard member and of a width sufficient to clear said tube portion and indicating arm as said guard member is slipped axially over the cylindrical portion of said Buordon tube; and means for rigidly securing said guard member to said base member.

References Cited in the file of this patent

UNITED STATES PATENTS

| 1,681,109 | Fitts | Aug. 14, 1928 |
| 1,855,088 | Boenker et al. | Apr. 19, 1932 |
| 2,230,544 | Noble | Feb. 4, 1941 |

FOREIGN PATENTS

| 1,116 | Great Britain | Mar. 15, 1881 |